(12) United States Patent
Tsai et al.

(10) Patent No.: US 7,374,139 B2
(45) Date of Patent: May 20, 2008

(54) RETRACTABLE SUPPORT TUBE STRUCTURE

(75) Inventors: Ching-Tsai Tsai, Taoyuan (TW); Chin-Lung Tsai, Taoyuan (TW); Chi-Chang Chen, Taoyuan (TW)

(73) Assignee: Jiinming Industry Co., Ltd., Taoyuan (TW)

( * ) Notice: Subject to any disclaimer, the term of this patent is extended or adjusted under 35 U.S.C. 154(b) by 172 days.

(21) Appl. No.: 11/242,479

(22) Filed: Oct. 3, 2005

(65) Prior Publication Data
US 2007/0034756 A1 Feb. 15, 2007

(30) Foreign Application Priority Data
Aug. 10, 2005 (TW) .............................. 94213644 U

(51) Int. Cl.
*F16M 11/00* (2006.01)
(52) U.S. Cl. ...................... 248/161; 248/404; 248/600; 248/157; 248/917; 361/681
(58) Field of Classification Search ................ 248/161, 248/404, 600, 157, 917; 361/681
See application file for complete search history.

(56) References Cited

U.S. PATENT DOCUMENTS

| | | | | | |
|---|---|---|---|---|---|
| 3,112,910 | A | * | 12/1963 | Bal | 248/161 |
| 6,702,238 | B1 | * | 3/2004 | Wang | 248/125.8 |
| 6,712,321 | B1 | * | 3/2004 | Su et al. | 248/123.11 |
| 6,796,537 | B1 | * | 9/2004 | Lin | 248/162.1 |
| 6,854,697 | B2 | * | 2/2005 | Akaike | 248/161 |
| 6,874,743 | B2 | * | 4/2005 | Watanabe et al. | 248/276.1 |
| 6,918,564 | B2 | * | 7/2005 | Yen et al. | 248/404 |
| 6,938,869 | B2 | * | 9/2005 | Lin et al. | 248/414 |
| 6,966,532 | B2 | * | 11/2005 | Ishizaki et al. | 248/274.1 |
| 6,994,303 | B2 | * | 2/2006 | Lin et al. | 248/122.1 |
| 6,997,422 | B2 | * | 2/2006 | Sweere et al. | 248/123.11 |
| 7,036,787 | B1 | * | 5/2006 | Lin | 248/676 |
| 7,159,828 | B1 | * | 1/2007 | Yau et al. | 248/125.8 |
| 7,193,843 | B2 | * | 3/2007 | Hsu | 361/681 |
| 7,195,214 | B2 | * | 3/2007 | Lee et al. | 248/125.8 |
| 2004/0118984 | A1 | * | 6/2004 | Kim et al. | 248/149 |
| 2005/0184215 | A1 | * | 8/2005 | Lin | 248/676 |
| 2006/0219849 | A1 | * | 10/2006 | Chiu | 248/125.8 |
| 2007/0102600 | A1 | * | 5/2007 | Ishizaki et al. | 248/176.3 |

FOREIGN PATENT DOCUMENTS

CN ZL 03203726.0 2/2004

* cited by examiner

*Primary Examiner*—Anita M. King
*Assistant Examiner*—Nkeisha J Dumas
(74) *Attorney, Agent, or Firm*—Bucknam and Archer

(57) ABSTRACT

A retractable support arm structure, which is applied between a base and a steering mechanism of a LCD stand includes an upright arm having a hollow part, an telescopic arm having one end inserted into the hollow part, and a spring member located between the upright arm and the telescopic arm to store a upwardly extending potential energy and several friction members therebetween are used to maintain the balance. The upright arm and the telescopic arm are constituted by square tube made by seamless corner bar.

8 Claims, 5 Drawing Sheets

RETRACTABLE SUPPORT TUBE STRUCTURE

BACKGROUND OF THE INVENTION

1. Field of the Invention

The present invention provides an improvement on China Patent Utility No. ZL 03 2 03726.0, entitled "Rack for LCD Monitor".

2. Description of the Related Art

FIGS. 1 and 2 show a rack for LCD monitor according to China Patent Utility No. ZL 03 2 03726.0. This rack is adapted to support a LCD monitor or LCD TV, allowing adjustment of the elevation and angle of the LCD monitor or LCD TV. According to this design, the rack comprises a base (10'), which has a horizontally extended area that can be positioned on a flat surface positively, an upright tube (11') vertically upwardly extended from the base (10') at the top, a telescopic arm (12') inserted into the upright tube (11'), a resilient means (13') that imparts an upward force to the telescopic arm (12') relative to the upright tube (11'), a holder frame (20') fixedly provided at the free end of the telescopic arm (12'), a first steering member (21') pivotally connected to the holder frame (20') by a Z-axis pivot, a second steering member (22') pivotally connected to the holder frame (20') by a pair of X-X axis pivot and turnable in direction perpendicular to the first steering member (21'), and a third steering member (23') pivotally connected to the front side of the second steering member (22') by a Y-axis pivot and adapted to bearing the load and freely rotatable relative to the second steering member (22'). In FIG. 1, the resilient means (13') is an air cylinder (13') provided within a space at the center of said telescopic arm (12'), having a cylindrical casing (131') with its one end connected to the free end of the telescopic arm (12'), a piston (133') axially movably supported in the cylindrical casing (131'), and a piston rod (132') for driving the piston (133') being fixedly fastened to the base (10'). When the telescopic arm (12') is lowered, the air cylinder (13') imparts a resisting force to the telescopic arm (12'). According to this design, the capacity of the air cylinder (13') is determined in such a way that the resisting force of the air cylinder (13') is slightly larger than the load at the third steering member (23'), and the pressure difference between the resisting force of the air cylinder (13') and the load is set up by the friction force between the telescopic arm (12') and the upright tube (11'). Therefore, the telescopic arm (12') can be freely moved up and down relative to the upright tube (11') and then positioned in the desired position. According to the embodiment shown in FIG. 2, the resilient means (13') is a spring (13") which achieves the same effect.

SUMMARY OF THE INVENTION

The present invention has been accomplished under the circumstances in view. It is the main object of the present invention to provide a retractable support tube structure, which is easy to adjust, inexpensive to manufacture, and durable in use.

To achieve these and other objects of the present invention, the retractable support arm structure is connected between a base and a steering mechanism to support a load at the steering mechanism, comprising an upright tube, which has a bottom end fixedly fastened to the base, a top end, and a longitudinal receiving space extending through the top end and bottom end; an telescopic arm, which has a bottom end inserted into the longitudinal receiving space of the upright tube and a top end connected to said steering mechanism; a first friction member, which is capped on the top end of the upright tube and disposed in contact with the periphery of the telescopic arm; a second friction member, which is capped on the bottom end of the telescopic arm and disposed in contact with the inside wall of the upright tube; and a spring member, which has a top fastened to the upright tube inside the longitudinal receiving space and a bottom end coiled up to form a helical spring portion that is to stop against the second friction member.

The upright tubes and the telescopic arms can be directly obtained from commercial available seamless rectangular stainless or aluminum alloy tubes for the advantage of low cost. Comparing to seamed tubes, seamless tubes have higher structural strength. Therefore, the upright tubes and the telescopic arms are durable against friction.

According to the present invention, the spring member is mounted inside the upright tube and preserves a potential energy against the load carried on the steering mechanism at the telescopic arm. The weight of the load at the steering mechanism is slightly smaller than the resisting force of the spring member. The force difference between the spring member and the load is balanced by the force exerted by the first friction member and the second friction member. The first friction member imparts a friction resistance to the outside wall of the telescopic arm, while the second friction member imparts a friction resistance to the inside wall of the upright tube. Therefore, the telescopic arm can be freely adjusted relative to the upright tube in well-controlled manner to reach balanced state at any point and thereby firmly positioned at any position to hold the LCD monitor or LCD TV at the desired elevation. This retractable support tube structure is simple, and uses only a limited number of component parts. Therefore, the manufacturing cost of the retractable support tube structure is low. Further, the adjustment of the retractable support tube structure is also simple and requires less effort.

DETAILED DESCRIPTION OF THE PREFERRED EMBODIMENT

A retractable support tube structure according to the present invention is designed for use in a rack and connected between the base and a steering mechanism for supporting a LCD monitor or LCD TV, allowing adjustment of the height, direction and angle of the supported LCD monitor or LCD TV.

Figure 1:
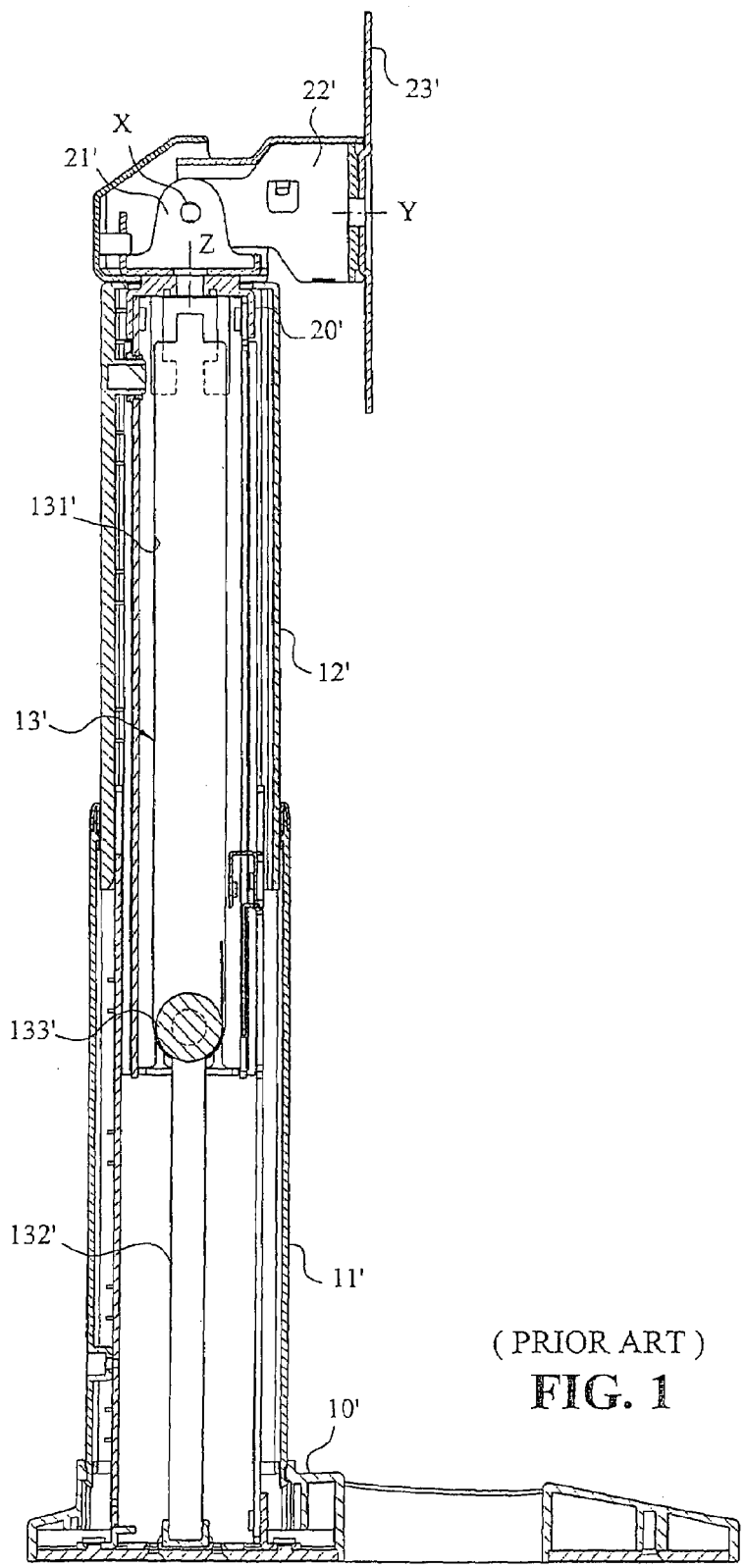
FIG. 1 is a schematic sectional view of a rack for LCD monitor according to the prior art of China Patent Utility No. ZL 03 2 03726.0.
Figure 2:
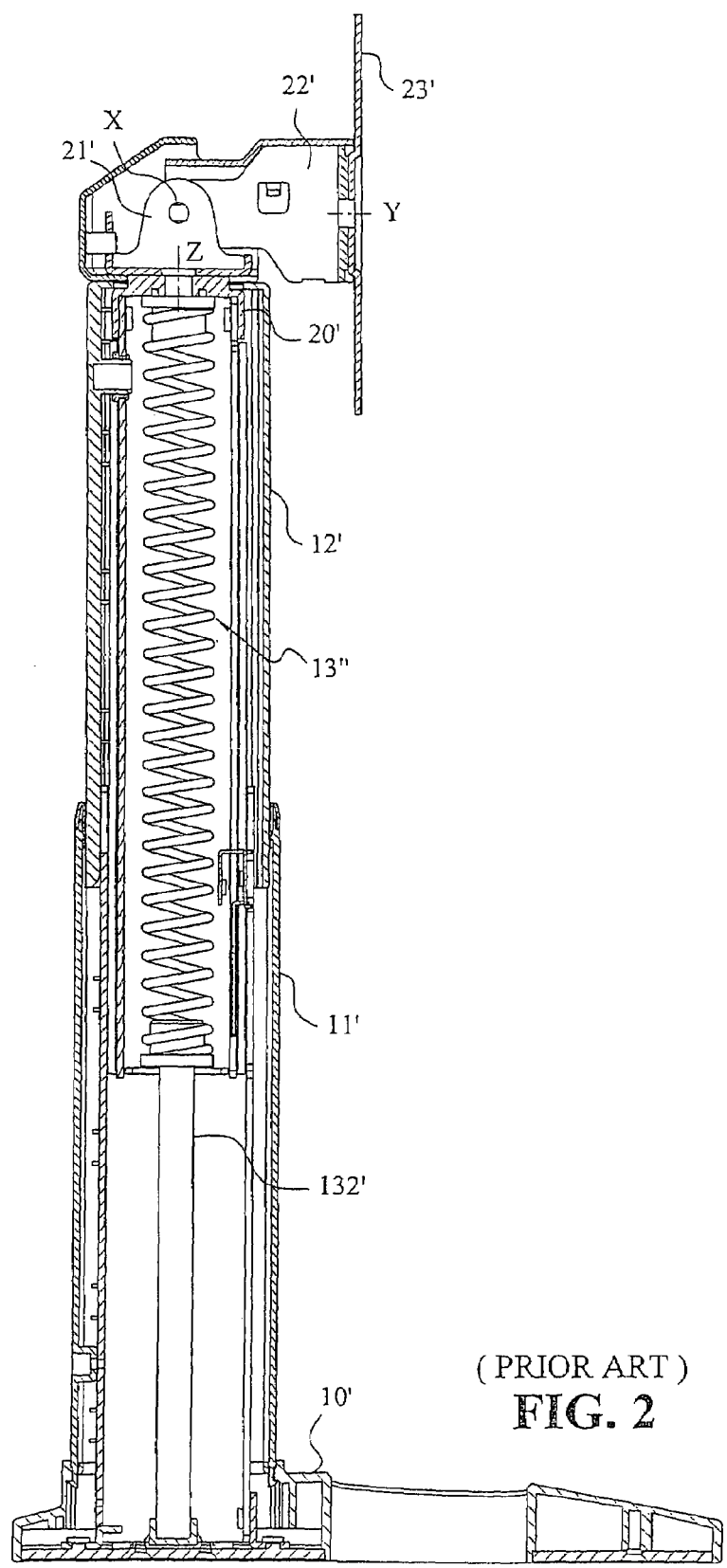
FIG. 2 is another schematic sectional view of an alternate form of the rack for LCD monitor according to the prior art China Patent Utility No. ZL 03 2 03726.0.
Figure 3:
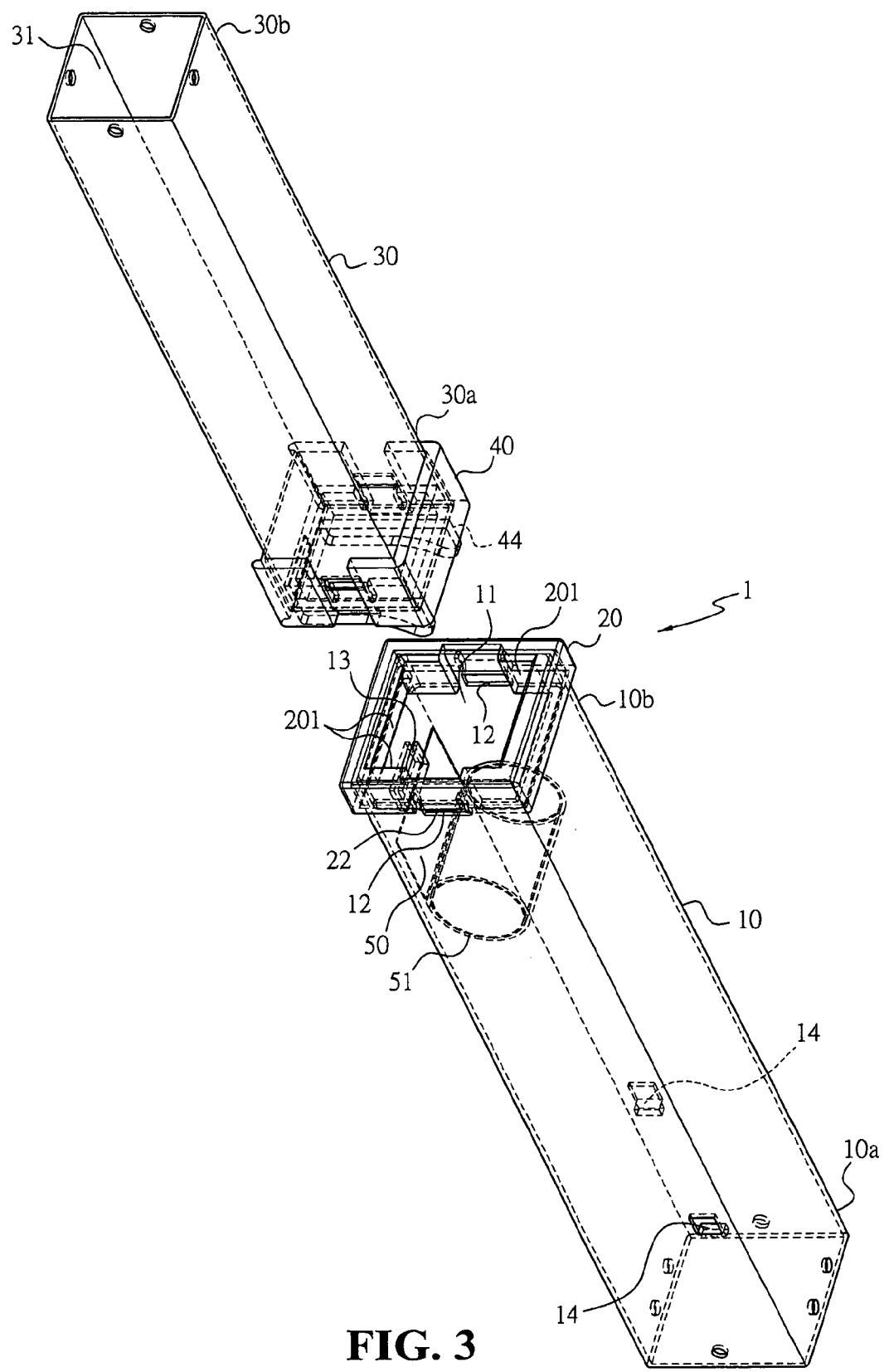
FIG. 3 is an exploded perspective view of a retractable support tube structure according to the present invention.
Figure 4:
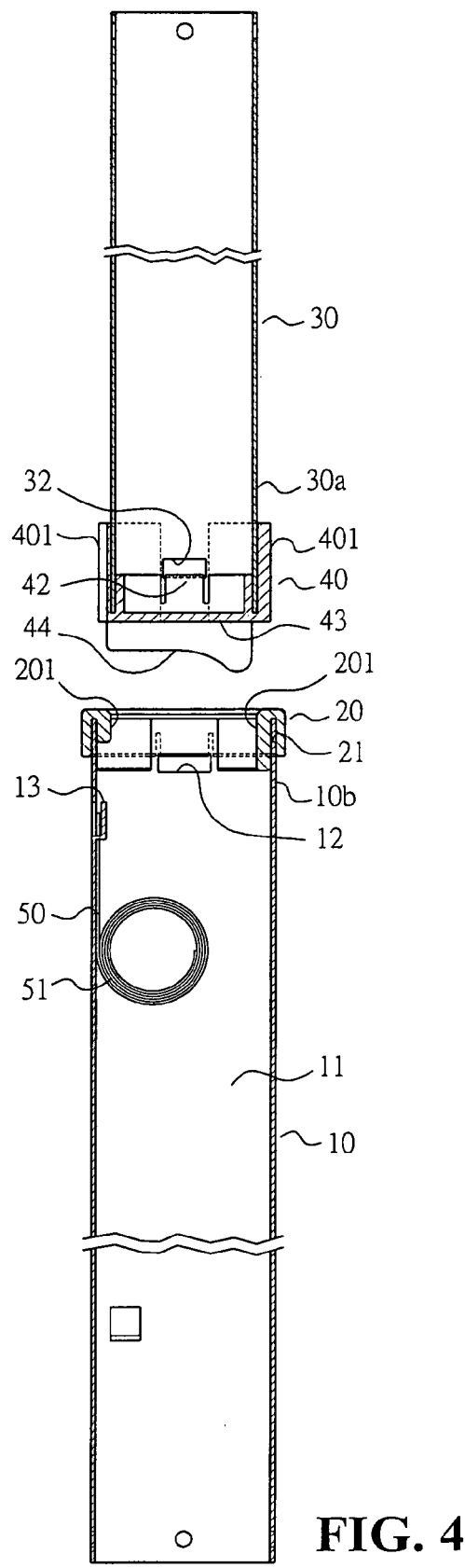
FIG. 4 is an exploded elevational view in cross-section of the retractable support tube structure according to the present invention shown in FIG. 3.
Figure 4A:
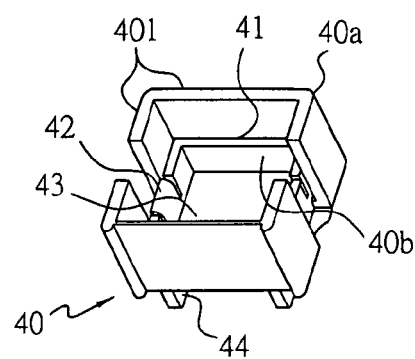
FIG. 4a is an elevational perspective view of the second friction member for the retractable support tube structure according to the present invention.
Figure 4B:
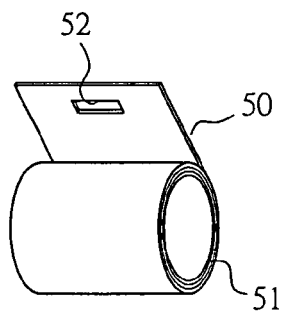
FIG. 4b is an elevational perspective view of the spring member for the retractable support tube structure according to the present invention.
Figure 4C:
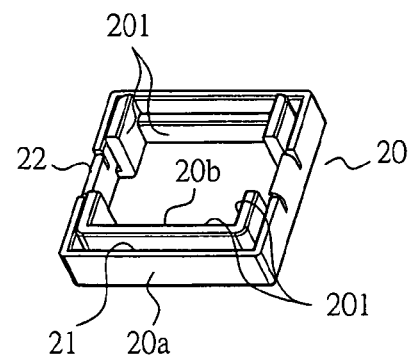
FIG. 4c is an elevational perspective view of the first friction member for the retractable support tube structure according to the present invention.

Referring to FIG. 3 and FIGS. 4~4c, the retractable support tube structure, referenced by 1, comprises an upright tube 10, a first friction member 20, an telescopic tube 30, a second friction member 40, and a spring member 50.

The upright tube 10 is a seamless rectangular tube that can be made out of metal, such as stainless steel or aluminum alloy, or nonmetal material such as plastics or FRP etc. The upright tube 10 has a bottom end 10a fixedly fastened to a base (not shown), a top end 10b in vertical alignment with the bottom end 10a, a longitudinal receiving space 11 extending through the top end 10a and the bottom end 10b, two hook holes 12 formed in the peripheral wall thereof at two opposite sides near the top end 10b, and two protruding inward stop portions 14 integrally formed with the peripheral wall at two opposite sides and respectively projecting into the longitudinal receiving space 11 adjacent to the bottom end 10a, and an inside hook 13 formed integrally with the peripheral wall at one side inside the longitudinal receiving space 11 and adjacent to the top end 10b.

The first friction member 20 (see FIG. 4c) is capped on the top end 10b of the upright tube 10, having an outer race 20a, an inner race 20b, a coupling groove 21 defined between the outer race 20a and the inner race 20b and coupled to the top end 10b of the upright tube 10, a plurality of friction pads 201 respectively fixedly fastened to the outer surface of the inner race 20b and suspending inside the longitudinal receiving space 11 of the upright tube 10 and extending along the four peripheral sides of the rectangular upright tube 10, and two hook portions 22 respectively formed integral with the outer race 20a at two opposite sides and respectively hooked in the hook holes 12 of the upright tube 10.

The telescopic arm 30 is a seamless rectangular tube that can be made out of metal, such as stainless steel or aluminum alloy, or nonmetal material such as plastics or FRP etc. The telescopic arm 30 has a bottom end 30a, a top end 30b mounted with a steering mechanism (not shown), a longitudinal open chamber 31 extending through the bottom end 30a and the top end 30b, and two hook holes 32 formed in the peripheral wall thereof at two opposite sides near the top end 30a.

The second friction member 40 (see FIG. 4a) is capped on the bottom end 30a of the telescopic arm 30, having an outer race 40a, an inner race 40b, a coupling groove 41 defined between the outer race 40a and the inner race 40b and coupled to the bottom end 30a of the telescopic tube 30, a plurality of friction pads 401 respectively fixedly fastened to the outer surface of the inner race 40b and suspending inside the longitudinal open chamber 31 of the telescopic arm 30 and extending along the four peripheral sides of telescopic arm 10, and two hook portions 42 respectively formed integral with the outer race 40a at two opposite sides and respectively hooked in the hook holes 32 of the telescopic arm 30. The second friction member 40 further has a bottom wall 43, and two arched abutting portions 44 downwardly protruding from the bottom wall 43.

The spring member 50 (see FIG. 4b) is mounted inside the longitudinal receiving space 11 of the upright tube 10, having one end provided with a hook hole 52 that is engaged with the corresponding hook 13 inside the longitudinal receiving space 11 of the upright tube 10 and the other end coiled up to form a helical spring portion 51 which preserves a potential energy. The arched abutting portions 44 of the second friction member 40 are pressed on the outer diameter of the helical spring portion 51.

Figure 5:
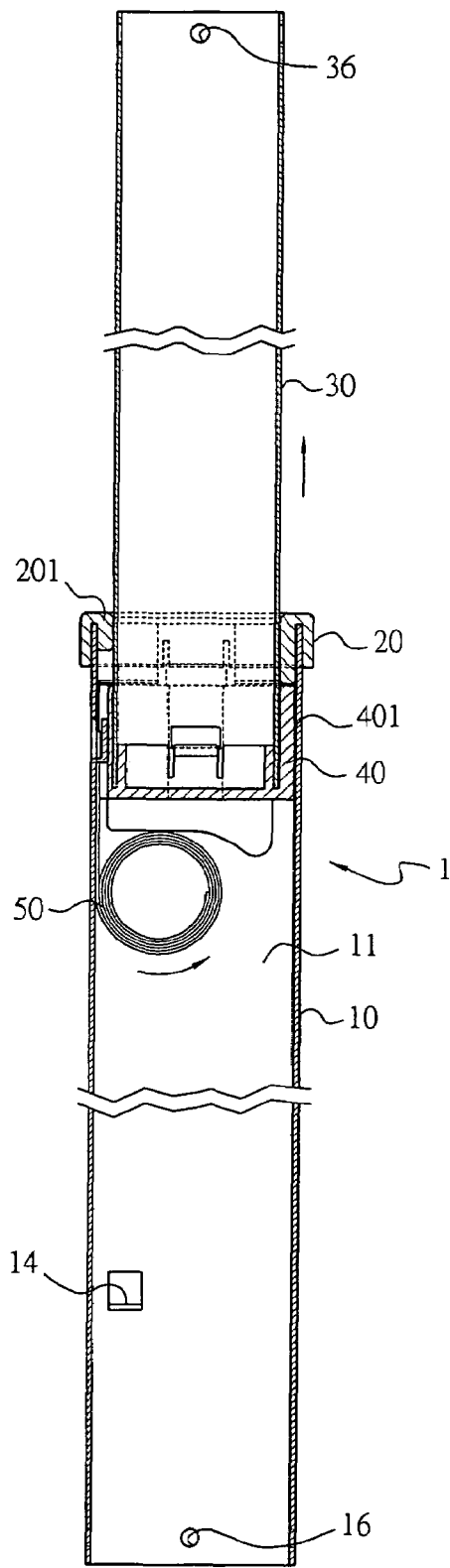
FIG. 5 is a schematic sectional drawing of the retractable support tube structure, showing the telescopic arm moved upwards relative to the upright tube according to the present invention.
Figure 6:
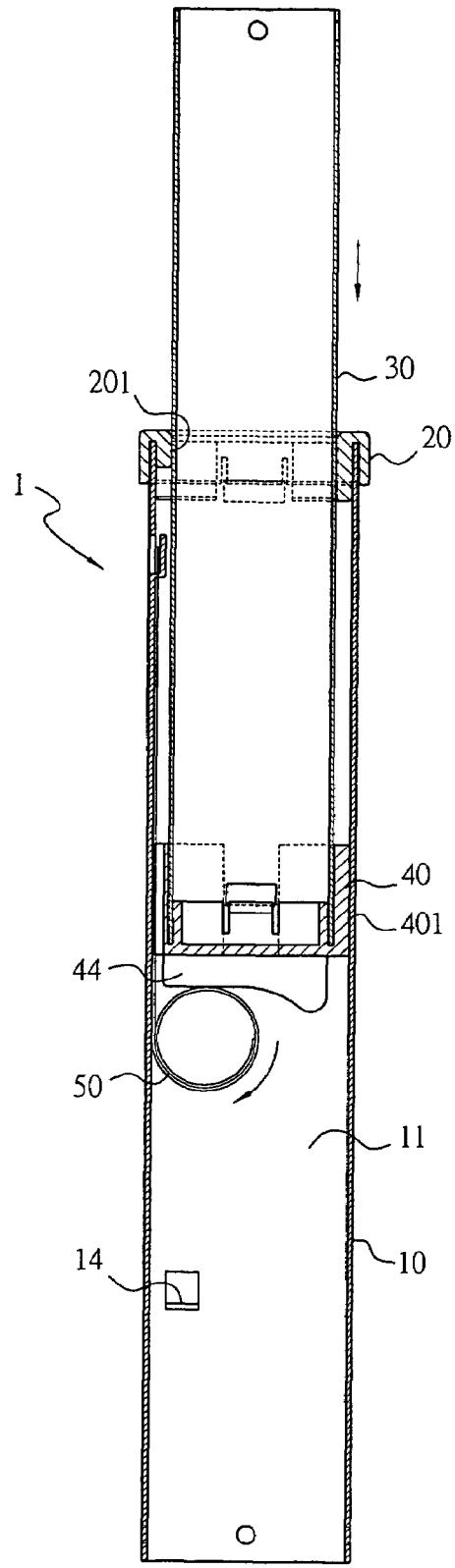
FIG. 6 is a schematic sectional drawing of the retractable support tube structure, showing the telescopic arm moved downwards relative to the upright tube according to the present invention.

Referring to FIGS. 5 and 6, the telescopic arm 30 is inserted into the longitudinal receiving space 11 of the upright tube 10. Further, the upright tube 10 has a plurality of threaded holes 16 spaced around the bottom end 10a for fastening to a base (not shown). The telescopic arm 30 has a plurality of threaded holes 36 spaced around the top end 30b for fastening to a steering mechanism (not shown) of load. When installed, the telescopic arm 30 can be moved in and out of the upright tube 10 and stopped in the desired position so that the retractable tube structure can be adjusted steplessly to the desired length (height). Further, the resisting (spring) force of the spring member 50 is determined by the load to be carried on the steering mechanism, i.e., the resisting (spring) force of the resilient member 50 is made slightly larger than the load, and the force difference exists therebetween. Further, the friction pads 201 of the first friction member 20 that are disposed at the top end of the upright tube 10 are stopped against the outside wall of the telescopic arm 30, and the friction pads 401 of the second friction member 40 that are disposed at the bottom end of the telescopic arm 30 are stopped against the inside wall of the upright tube 10, thereby holding the telescopic arm 30 in the upright tube 10 in balance state. When adjusting the elevation of the load (LCD monitor or LCD TV), pull the load vertically upwards in the arrow direction shown in FIG. 5 to move the telescopic arm 30 upwards relative to the upright tube 10. When released the hand from the load at this time, the telescopic arm 30 is held firmly to the upright tube 10 in the adjusted position. On the contrary, when pressing the load vertically downwards in the arrow direction showed in FIG. 6 to move the telescopic arm 30 downward relative to the upright tube 10. When released the hand from the load at this time, the telescopic arm 30 is held firmly to the upright tube 10 in the adjusted position.

Although a preferred embodiment of the invention has been described in detail for illustrative purposes, various modifications and enhancements can be made without departing from the spirit and scope of the invention.

What the invention claimed is:

1. A retractable support tube structure (1) positioned between a base and a steering mechanism, comprising:
    an upright tube (10), having a rectangular cross section with a longitudinal receiving space (11) formed centrally, a bottom end (10a) fixedly fastened to said base, a top end (10b) extending along a vertical direction;
    a first friction member (20) having an outer race (20a), an inner race (20b), and a coupling groove (21) defined between the outer race (20a) and inner race (20b) of said first friction member (20) and coupled to the top end (10b) of said upright tube (10);
    an telescopic arm (30), having a square cross section with a hollow portion (31) formed centrally, a bottom end (30a) inserted in said longitudinal receiving space (11) of said upright tube (10) and an outer periphery urged against said inner race (20b) of said first friction member;

a second friction member (40) having an outer race (40*a*) urged against an inner periphery of said longitudinal receiving space (11) of said upright tube (10), an inner race (40*b*), a coupling groove (41) defined between said outer race (40*a*) and inner race (40*b*) of said second friction member (40) and coupled to said bottom end (30*a*) of said telescopic arm (30); and a spring member (50) mounted inside said longitudinal receiving space (11) of said upright tube (10), having a first end fastened to said inner periphery inside said longitudinal receiving space (11) and a second end coiled up to form a helical spring portion (51) and stopped against the bottom side of said second friction member (40).

2. The retractable support tube structure (1) as claimed in claim 1, wherein said inner race (20*b*) of said first friction member (20) further comprises a plurality of friction pads (201) provided on the inner race (20*b*) along said inner periphery of said upright tube (10) so as to contact against said outer periphery of said telescopic arm (30).

3. The retractable support tube structure (1) as claimed in claim 1, wherein said upright tube (10) has at least two hook holes (12) disposed at two opposite sides near said top end (10*b*) thereof; said first friction member (20) comprises at least two hook portions (22) extending from said outer race (20*a*) thereof and respectively hooked in said hook hole (12) of said upright tube (10).

4. The retractable support tube structure (1) as claimed in claim 1, wherein said second friction member (40) further comprises a plurality of friction pads (401) provided on said outer race (40*a*) along said outer periphery of said telescopic arm (30) to contact against said inner periphery of said upright tube (10).

5. The retractable support tube structure (1) as claimed in claim 2, wherein said telescopic arm (30) has at least two hook holes (32) disposed at two opposite sides near the bottom end (30*a*) thereof; said second friction member (40) comprises at least two hook portions (42) extending from the inner race (40*b*) thereof and respectively hooked in said hook hole (32) of said telescopic arm (30).

6. The retractable support tube structure (1) as claimed in claim 3, wherein said second friction member (40) comprises a bottom wall (43), and two arched abutting portions (44) downwardly extending from said bottom wall (43) and pressed against an outer diameter of said helical spring portion (51) of said spring member (50).

7. The retractable support tube structure (1) as claimed in claim 1, wherein a top end of said upright tube (10) has an inside hook (13); said spring member (50) has a hook hole (52) disposed at said first end thereof and engaged with said inside hook (13) of said upright tube (10).

8. The retractable support tube structure (1) as claimed in claim 4, wherein a lower end of said upright tube (10) comprises a plurality of protruding stop portions (14) suspending inside said longitudinal receiving space (11) for limiting downward movement of said telescopic arm (30).

* * * * *